United States Patent [19]

Frankila et al.

[11] 4,331,350
[45] May 25, 1982

[54] SEAT BELT ANCHOR

[75] Inventors: John W. Frankila, Sterling Heights; Robert M. Kremer, Fraser, both of Mich.

[73] Assignee: Allied Corporation, Morris Township, Morris County, N.J.

[21] Appl. No.: 180,545

[22] Filed: Aug. 25, 1980

[51] Int. Cl.³ ............................................. A62B 35/02
[52] U.S. Cl. .................................... 280/801; 297/468; 410/116
[58] Field of Search ................ 280/801, 808; 297/468, 297/482, 483; 188/1 C; 410/116, 158, 85, 55, 21, 10, 11, 143

[56] References Cited
U.S. PATENT DOCUMENTS

| 2,970,358 | 2/1961 | Elsner | 410/116 |
| 3,323,186 | 6/1967 | Rennert | 410/116 |
| 3,837,048 | 9/1974 | Lewis et al. | 410/116 |
| 4,103,933 | 8/1978 | Fisher et al. | 280/801 |

FOREIGN PATENT DOCUMENTS 2311562 12/1976 France ............................. 280/801

Primary Examiner—Joseph F. Peters, Jr.
Assistant Examiner—Ross Weaver
Attorney, Agent, or Firm—Roger H. Criss

[57] ABSTRACT

A seat belt anchor assembly including an anchor around which a loop of seat belt webbing is retained, and openings in both portions of the webbing aligned with an aperture in the anchor for mounting the anchor to a structural part of a vehicle.

14 Claims, 5 Drawing Figures

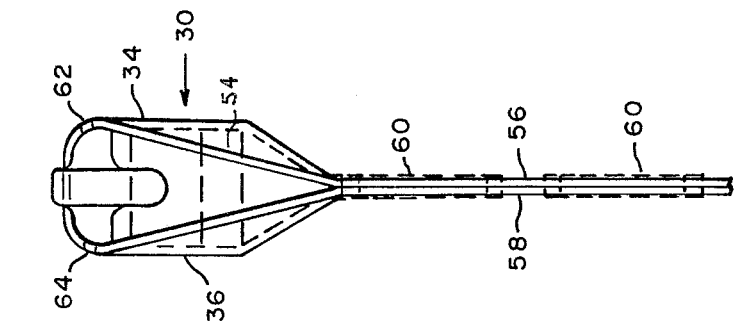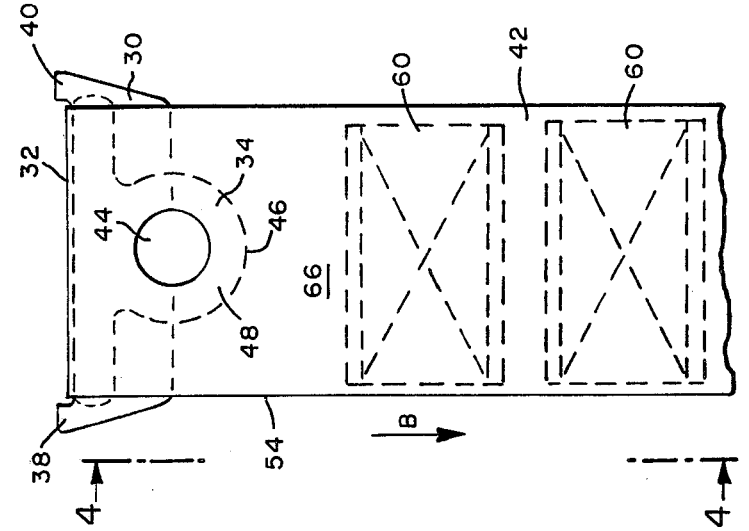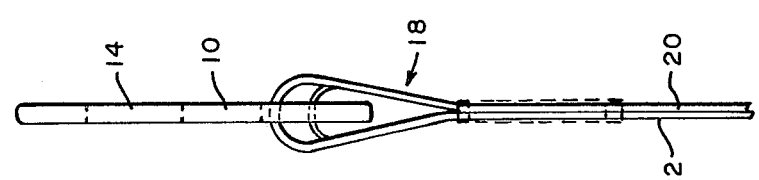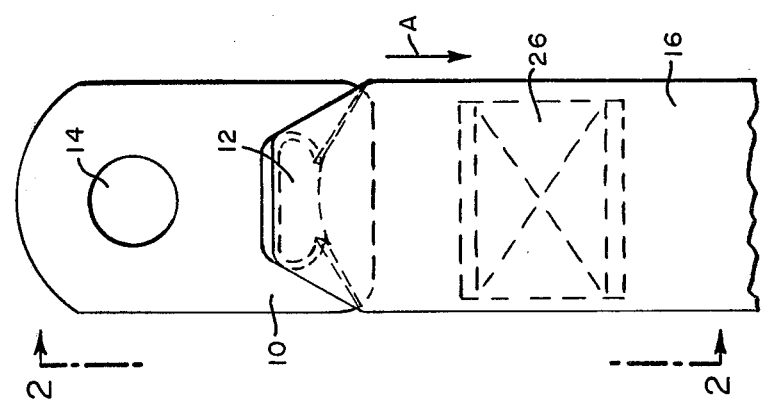

SEAT BELT ANCHOR

BACKGROUND OF THE INVENTION

1. Field of the Invention

This invention relates to anchorage elements for seat belt assemblies.

2. Description of the Prior Art

Typical seat belt anchorages incorporate seat belt webbing sewn to a metal anchor plate, which, in turn, is bolted to a vehicle structural member. The metal anchor plate serves to distribute the load over the full width of the seat belt webbing and to prevent roping of the webbing. The anchor plate then transfers the load to the mounting bolt, and subsequently to the vehicle structural member. One type of such an anchor plate is shown in U.S. Pat. No. 4,103,933. In the typical application, the anchor plate is loaded in tension.

Light weight materials, such as plastics, have been excluded from anchor applications because they do not have sufficient tensile strength. It would be desirable if a load bearing light weight seat belt anchorage member were provided.

SUMMARY OF THE INVENTION

In accordance with this invention, there is provided a seat belt anchorage member adapted to attach seat belt webbing to a structural part of a vehicle, the anchorage member comprising:

a first surface having a width at least as wide as the width of the seat belt webbing, the first surface adapted to contact the seat belt webbing when the webbing is looped about the anchorage member; and mounting means spaced from the first surface and comprising an aperature, the aperature adapted to receive a mounting member for mounting the anchorage means to the structural part of the vehicle, the aperature adapted to communicate with openings in the loop of webbing, the anchor member being subjected to compressive forces when a load is placed on the seat belt webbing.

Also, in accordance with this invention, there is provided a seat belt anchorage assembly for installation in a vehicle, comprising:

seat belt webbing having a loop therein defining first and second portions of the seat belt webbing; and an anchorage member comprising:

a first surface having a width at least as wide as the width of the seat belt webbing; and mounting means in the form of an aperature spaced from the first surface;

the loop of webbing extending about the anchorage member and around the first surface, the openings and the aperature adapted to receive a mounting member for mounting the assembly in the vehicle, the anchorage member being subjected to compressive forces when a load is placed on the seat belt webbing.

The anchorage member preferably is formed of a plastic material that is molded as an integral piece. Since the anchorage member is subjected to compressive forces rather than tensile forces upon loading of the seat belt webbing, a plastic or other light weight material may be utilized as the anchorage member.

BRIEF DESCRIPTION OF THE DRAWINGS

FIG. 1 is a plan view of a prior art anchor assembly.

FIG. 2 is a cross-section view taken along line 2—2 of FIG. 1.

FIG. 3 is a plan view of the anchorage assembly of this invention.

FIG. 4 is a cross-section view taken along line 4—4 of FIG. 3.

DESCRIPTION OF THE PREFERRED EMBODIMENTS

Figure 5:
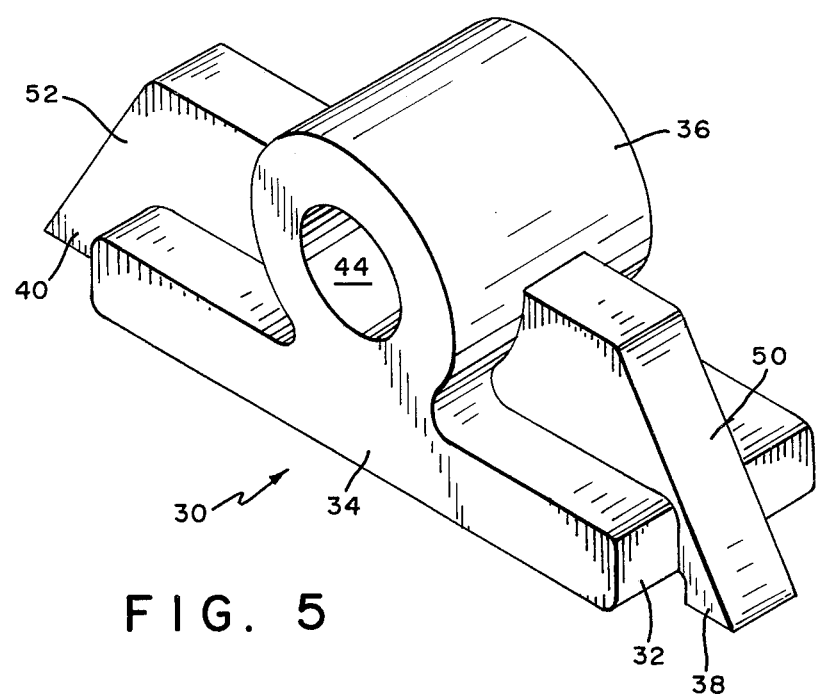
FIG. 5 is a perspective view of the anchorage assembly of this invention.

A prior art anchorage assembly is shown in FIGS. 1 and 2. The assembly includes a thin metal plate 10 provided with a D-shaped opening 12 at one end of the plate, and a mounting hole 14 at its other end which is adapted to receive a mounting bolt (not shown). Seat belt webbing 16 is formed into a loop 18 and is folded slightly over as it extends through opening 12. Webbing 16 has upper and lower portions 20 and 22 which are sewn together by conventional stitching 26.

In the event that seat belt webbing 16 is subjected to a load in the direction of arrow A in FIG. 1 as a result, e.g., of collision forces, it can be seen that plate 10 is loaded in tension in the area between hole 14 and opening 12. Thus, the tensile strength of plate 10 must be sufficiently high to withstand such collision forces. This has excluded the use of such light weight materials as plastic materials for forming plate 10.

FIGS. 3–5 illustrate the anchorage assembly of the present invention. The assembly includes an anchorage member 30 preferably formed as an integral plastic part. Anchor member 30 has a first exterior surface 32, a top surface 34, and a bottom surface 36. Tabs 38 and 40 extend outwardly from surface 32 along the lateral edges thereof and at a location approximately midway between top and bottom surfaces 34 and 36. The width of first surface 32 is greater than the width of seat belt webbing 42 and in fact tabs 38 and 40 are preferably spaced at a sufficient distance such that webbing 42 fits snugly there between. Tabs 38 and 40 serve to prevent webbing 42 from slipping off anchorage 30 during normal usage and under load conditions.

Spaced rearwardly from first surface 32 is a circular aperature 44 extending totally through member 30. Aperature 44 is adapted to receive a standard mounting bolt (not shown) for mounting to a structural part of a vehicle, such as the floor or B pillar. The rearward portion 46 of member 30 is defined by an arc portion of wall 48 surrounding aperature 44. Thin connecting sections 50 and 52 connect the forward and rearward portions of member 30 adjacent the lateral edges of wall 48. Top and bottom surfaces 34 and 36 may be slightly bevelled downwards extending from rearward portion 46 towards first surface 32.

Seat belt webbing 42 is formed into a loop 54 having upper and lower portions 56, 58 of webbing 42. Such portions are fastened together by one or more stitch patterns 60, which are located adjacent to rearward portion 46.

Loop 54 of webbing 42 extends about anchorage member 30 from its rearward portion towards its forward portion and contacts first surface 32 at the forward portion of member 30. Both upper and lower portion 56, 58 of webbing 42 are provided with openings preferably in the form of circular aperatures 62, 64, which at least are partially aligned and preferably are coextensive with aperature 44. Openings 62, 64 may be placed in webbing 30 before or after loop 54 is wrapped around member 30. For example, holes may be punched out of the webbing and sealed with heat or may be reinforced by sewing in a manner similar to a button hole pattern. Openings 62 and 64 likewise are adapted to receive a mounting bolt, which extends through opening 62 and upper portion 56 of webbing 42, then through opening 44 of member 30, then through opening 64 in lower portion 58 of webbing 42, and finally to the structural member of the vehicle. If desired, suitable washers may be used in conjunction with the mounting bolt.

The end of webbing 42 opposite to member 30 is adapted to receive a component of a safety belt system, such as a buckle or tongue portion of a buckle and tongue assembly, a direction changing bracket (commonly known as a D-ring or run-through bracket) or the like.

In the event that seat belt webbing 42 is subjected to a load in the direction of arrow B in FIG. 3 resulting from collision or other forces acting on the belt, it can be seen that anchorage member 30 is loaded in compression in the area 66 located between first surface 32 and aperature 44 (through which the mounting bolt extends). Since many plastic materials have compressive strength sufficient for the requirements of a seat belt anchorage member, member 30 may be and is preferably formed of a plastic material. Examples of such plastic materials are nylon, acetal, polyesters, polycarbonates and the like. It should be noted that anchor member 30 extends across the full width of the webbing and thus distributes the loads over the full width of the webbing.

If desired, tabs 38 and 40 may extend so that they are joined together, with webbing 42 extending between the slot formed between first surface 32 and the joined tabs. This would provide additional protection against the loop of webbing from slipping off of anchor member 30 and stitch patterns 60 would then not have to be located as close to the rearward end of anchor 30 for such purpose. Accordingly, as used herein the term "looped about" the anchorage member is intended to include the above-described embodiment.

It is to be understood that variations and modifications of the present invention may be made without departing from the scope thereof. It is also to be understood that the present invention is not to be limited by the specific embodiments disclosed herein but only in accordance with the appended claims when read in light of the foregoing specification.

What is claimed is:

1. A seat belt anchorage member adapted to attach seat belt webbing to a structural part of a vehicle, said anchorage member comprising:
   a first surface having a width at least as wide as the width of said seat belt webbing, said first surface adapted to contact said seat belt webbing when said webbing is looped about said anchorage member; and
   mounting means spaced from said first surface and comprising an aperature, said aperature adapted to receive a mounting member for mounting said anchorage means to said structural part of said vehicle, said aperature adapted to communicate with openings in said loop of webbing, said anchorage member being subjected to compressive forces when a load is placed on said seat belt webbing.

2. The anchorage member of claim 1 wherein said member is formed of a plastic material.

3. The anchorage member of claim 2 wherein said first surface is wider than the width of said seat belt webbing.

4. The anchorage member of claim 2 wherein said member is molded as an integral piece.

5. The anchorage member of claim 1 including retaining means extending from said first surface effective to limit movement of said seat belt webbing laterally with respect to said anchorage member.

6. The anchorage member of claim 5 wherein said retaining means comprises tabs provided on said first surface adjacent the lateral edges thereof.

7. The anchorage member of claim 6 wherein said member is formed of a plastic material.

8. The anchorage member of claim 1 including a rearward portion defined by at least a portion of a wall surrounding said aperature, and connecting sections having a thickness less than the full thickness of said member and connecting said first surface and said rearward portion.

9. A seat belt anchorage assembly for installation in a vehicle, comprising:
   seat belt webbing having a loop therein and defining first and second portions of said seat belt webbing; and
   an anchorage member comprising:
   a first surface having a width at least as wide as the width of said seat belt webbing; and
   mounting means in the form of an aperature spaced from said first surface;
   said loop of webbing extending about said anchorage member and around said first surface, said first and second portions of said seat belt webbing being provided with openings at least partially aligned with said aperature of said anchorage member, said openings and said aperature adapted to receive a mounting member for mounting said assembly in said vehicle, said anchorage member being subjected to compressive forces when a load is placed on said seat belt webbing.

10. The anchorage assembly of claim 9 wherein said openings in said first and second portions of said webbing are fully aligned with said aperture in said anchorage member.

11. The anchorage assembly of claim 9 wherein said first and second portions of said webbing are stitched together adjacent to said anchorage member, thereby defining said loop.

12. The anchorage assembly of claim 9 wherein said anchorage member is formed of a plastic material.

13. The anchorage assembly of claim 9 including lateral retaining means on said first surface effective to limit lateral movement of said loop of webbing.

14. The anchorage assembly of claim 13 wherein said retaining means comprises tabs provided on said first surface adjacent the lateral edges thereof.

* * * * *